United States Patent [19]
Marsh

[11] Patent Number: 5,740,720
[45] Date of Patent: Apr. 21, 1998

[54] MULTIPLE-DOUGHNUT FRYER SYSTEM

[76] Inventor: David L. Marsh, 336 W. Lawson Rd. #4, Dallas, Tex. 75253

[21] Appl. No.: 870,060

[22] Filed: Jun. 5, 1997

[51] Int. Cl.6 .............................. A47J 27/00; A47J 37/00; A47J 37/12
[52] U.S. Cl. .............................. 99/330; 99/331; 99/342; 99/403; 99/416
[58] Field of Search .............................. 99/325–333, 336, 99/341, 342, 403–418; 126/391, 15 A, 39 K, 373, 374, 376, 375, 351; 134/135; 210/153, DIG. 8, 167, 171, 180, 181; 426/438; 431/326, 328, 284; 219/429, 432, 438, 440; D7/323, 354, 358–360

[56] References Cited

U.S. PATENT DOCUMENTS

| | | | |
|---|---|---|---|
| 4,668,390 | 5/1987 | Hurley et al. | 210/167 |
| 4,838,244 | 6/1989 | Giles, Sr. et al. | 126/391 |
| 4,848,317 | 7/1989 | Prudhomme et al. | 126/391 |
| 4,858,592 | 8/1989 | Hayek et al. | 126/373 |
| 4,898,151 | 2/1990 | Luebke et al. | 126/391 |
| 4,913,041 | 4/1990 | Taber et al. | 99/403 |
| 4,913,042 | 4/1990 | Miller | 99/404 |
| 4,945,826 | 8/1990 | Ripatonda | 99/357 |
| 4,948,950 | 8/1990 | Rae | 219/497 |
| 4,963,378 | 10/1990 | Bhardwaj | 426/302 |
| 5,033,368 | 7/1991 | Brewer | 99/403 |
| 5,209,218 | 5/1993 | Daneshvar | 126/391 |
| 5,335,776 | 8/1994 | Driskill | 99/330 |

*Primary Examiner*—Timothy F. Simone

[57] ABSTRACT

A new Multiple-Doughnut Fryer System for deep frying a plurality of doughnuts simultaneously and uniformly within one convenient deep fryer. The inventive device includes a housing having a top opening, a fry tank within the housing, three wire mesh baskets removably positioned within the fry tank, and an elongated heating element near the fry tank for heating cooking oil within the fry tank. The wire mesh baskets include a vertical member secured near a looped handle, wherein an aperture and a slot project into the vertical member for removably catching upon a support pin secured to the fry tank for supporting the wire mesh basket within the fry tank.

6 Claims, 3 Drawing Sheets

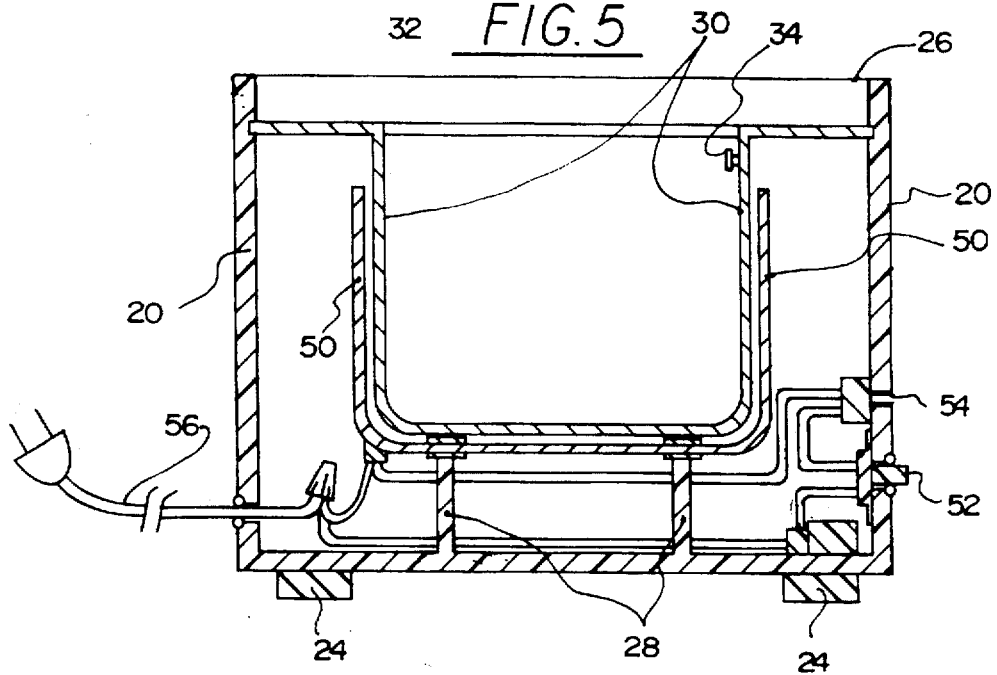
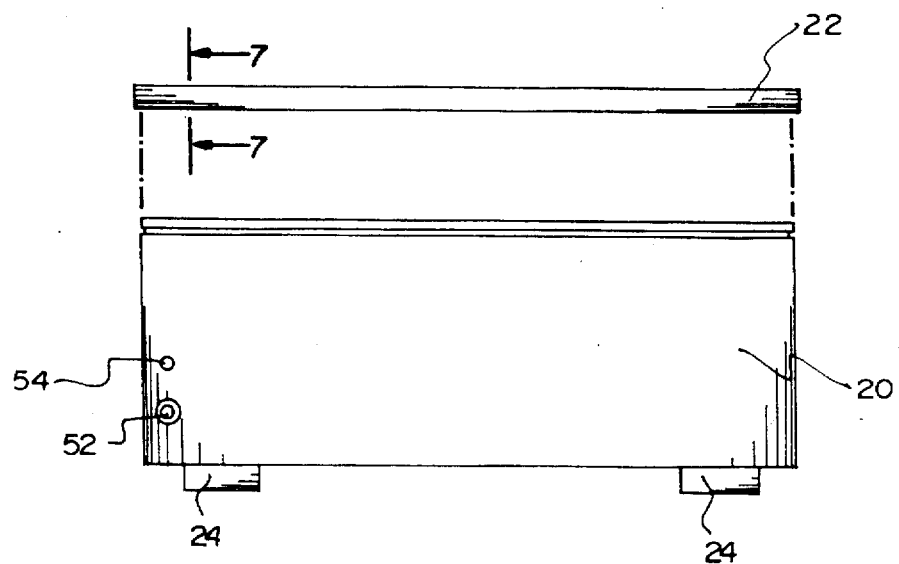

5,740,720

MULTIPLE-DOUGHNUT FRYER SYSTEM

BACKGROUND OF THE INVENTION

1. Field of the Invention

The present invention relates to Deep Fat Fryer Devices and more particularly pertains to a new Multiple-Doughnut Fryer System for deep frying a plurality of doughnuts simultaneously and uniformly within one convenient deep fryer.

2. Description of the Prior Art

The use of Deep Fat Fryer Devices is known in the prior art. More specifically, Deep Fat Fryer Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Deep Fat Fryer Devices include U.S. Pat. No. 5,355,776; U.S. Pat. No. 5,033,369; U.S. Design Pat. No. 345,280; U.S. Pat. No. 5,209,218; U.S. Pat. No. 4,913,041 and U.S. Pat. No. 4,668,390.

While these devices fulfill their respective, particular objectives and requirements, the aforementioned patents do not disclose a new Multiple-Doughnut Fryer System. The inventive device includes a housing having a top opening, a fry tank within the housing, three wire mesh baskets removably positioned within the fry tank, and an elongated heating element near the fry tank for heating cooking oil within the fry tank.

In these respects, the Multiple-Doughnut Fryer System according to the present invention substantially departs from the conventional concepts and designs of the prior art, and in so doing provides an apparatus primarily developed for the purpose of deep frying a plurality of doughnuts simultaneously and uniformly within one convenient deep fryer.

SUMMARY OF THE INVENTION

In view of the foregoing disadvantages inherent in the known types of Deep Fat Fryer Devices now present in the prior art, the present invention provides a new Multiple-Doughnut Fryer System construction wherein the same can be utilized for deep frying a plurality of doughnuts simultaneously and uniformly within one convenient deep fryer.

The general purpose of the present invention, which will be described subsequently in greater detail, is to provide a new Multiple-Doughnut Fryer System apparatus and method which has many of the advantages of the Deep Fat Fryer Devices mentioned heretofore and many novel features that result in a new Multiple-Doughnut Fryer System which is not anticipated, rendered obvious, suggested, or even implied by any of the prior art Deep Fat Fryer Devices, either alone or in any combination thereof.

To attain this, the present invention generally comprises a housing having a top opening, a fry tank within the housing, three wire mesh baskets removably positioned within the fry tank, and an elongated heating element near the fry tank for heating cooking oil within the fry tank.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Multiple-Doughnut Fryer System apparatus and method which has many of the advantages of the Deep Fat Fryer Devices mentioned heretofore and many novel features that result in a new Multiple-Doughnut Fryer System which is not anticipated, rendered obvious, suggested, or even implied by any of the prior art Deep Fat Fryer Devices, either alone or in any combination thereof.

It is another object of the present invention to provide a new Multiple-Doughnut Fryer System which may be easily and efficiently manufactured and marketed.

It is a further object of the present invention to provide a new Multiple-Doughnut Fryer System which is of a durable and reliable construction.

An even further object of the present invention is to provide a new Multiple-Doughnut Fryer System which is susceptible of a low cost of manufacture with regard to both materials and labor, and which accordingly is then susceptible of low prices of sale to the consuming public, thereby making such Multiple-Doughnut Fryer System economically available to the buying public.

Still yet another object of the present invention is to provide a new Multiple-Doughnut Fryer System which provides in the apparatuses and methods of the prior art some of the advantages thereof, while simultaneously overcoming some of the disadvantages normally associated therewith.

Still another object of the present invention is to provide a new Multiple-Doughnut Fryer System for deep frying a plurality of doughnuts simultaneously and uniformly within one convenient deep fryer.

Yet another object of the present invention is to provide a new Multiple-Doughnut Fryer System which includes a housing having a top opening, a fry tank within the housing, three wire mesh baskets removably positioned within the fry tank, and an elongated heating element near the fry tank for heating cooking oil within the fry tank.

Still yet another object of the present invention is to provide a new Multiple-Doughnut Fryer System that uniformly fries the dough by frying one side at a time within the cooking oil.

Even still another object of the present invention is to provide a new Multiple-Doughnut Fryer System that allows the user to make fresh doughnuts in the convenience of his or her home at the fraction of the cost of commercial doughnuts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross sectional view taken along line 5—5 of FIG. 1.

FIG. 6 is a front view of the present invention.

DESCRIPTION OF THE PREFERRED EMBODIMENT

Figure 1:
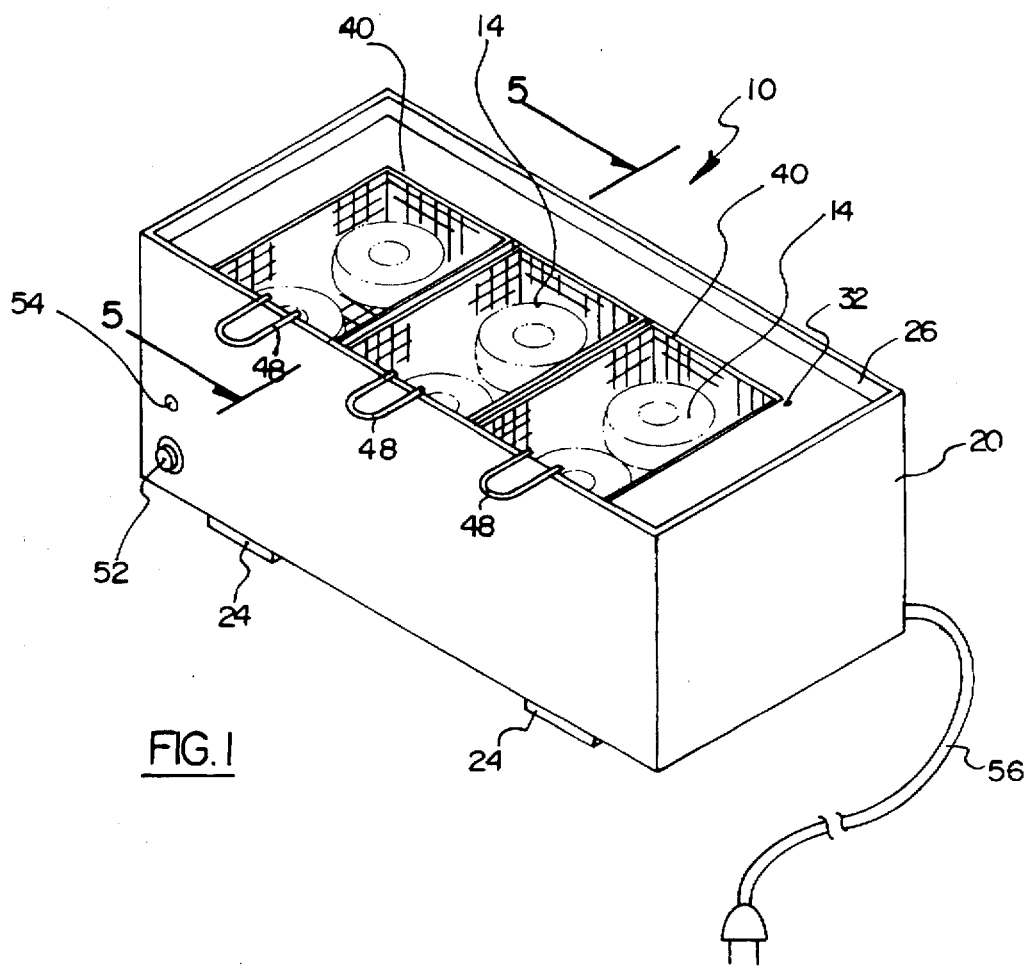
FIG. 1 is an upper perspective view of a new Multiple-Doughnut Fryer System according to the present invention.

With reference now to the drawings, and in particular to FIGS. 1 through 6 thereof, a new Multiple-Doughnut Fryer System embodying the principles and concepts of the present invention and generally designated by the reference numeral 10 will be described.

Figure 2:
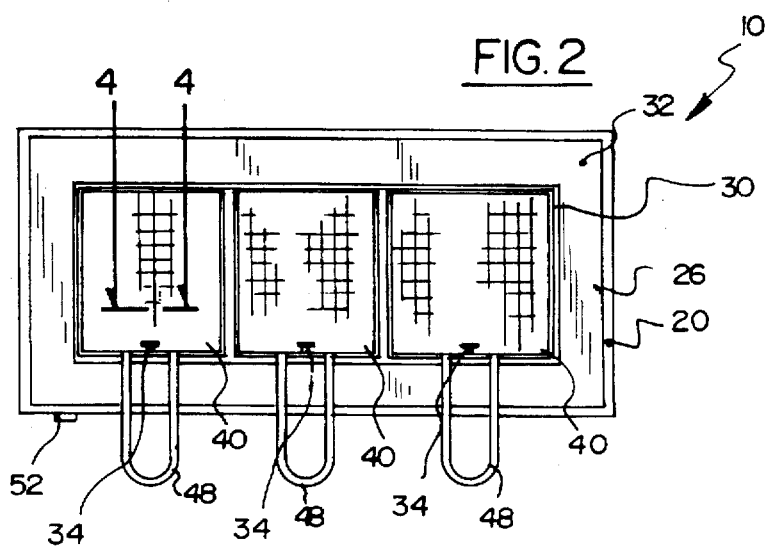
FIG. 2 is a top view of the present invention.

More specifically, it will be noted that the Multiple-Doughnut Fryer System 10 comprises a housing 20 having a top opening 26. A fry tank 30 has an upper flange 32 secured within the housing 20 for containing cooking oil 12 for frying a plurality of doughnuts 14 as best shown in FIG. 5 of the drawings. Three wire mesh baskets 40 are formed for removably projecting within the fry tank 30 adjacent to one another as shown in FIGS. 1 and 2 of the drawings. Each of the wire mesh baskets 40 is formed for removably receiving at least two of the doughnuts 14 as shown in FIG. 1 of the drawings. As shown in FIG. 5 of the drawings, an elongated heating element 50 has a U-shaped cross-sectional area. The elongated heating element 50 is adjacent the fry tank 30 for heating the cooking oil 12 for frying the plurality of doughnuts 14. An indicator light 54 is secured within the housing 20 and is electrically connected to the elongated heating element 50 as best shown in FIG. 5 of the drawings. A switch 52 is secured within the housing 20 and is electrically connected to the indicator light 54 opposite of the elongated heating element 50 for controlling the heat produced by the elongated heating element 50. A power cord 56 is electrically connected to the switch 52 opposite of the indicator light 54 for providing power to the elongated heating element 50 from a conventional outlet. A lid 22 is formed to removably snugly enclose the top opening 26 of the housing 20 thereby preventing the accumulation of debris within the cooking oil 12 as best shown in FIG. 6 of the drawings. The housing 20 and the fry tank 30 are preferably formed into an elongated rectangular shape. A plurality of gripping pads 24 are secured to a bottom surface of the floor of the housing 20 for gripping a support surface during utilization of the present invention.

As shown in FIG. 5 of the drawings a pair of elongated insulated support members 28 each having a bottom edge and a top edge. The bottom edge is secured to a floor of the housing 20. The top edge engages a bottom surface of the fry tank 30 thereby supporting the fry tank 30 as shown in FIG. 5. An upper portion of the insulated support members 28 engages the elongated heating element 50 thereby supporting the elongated heating element 50.

Figure 3:
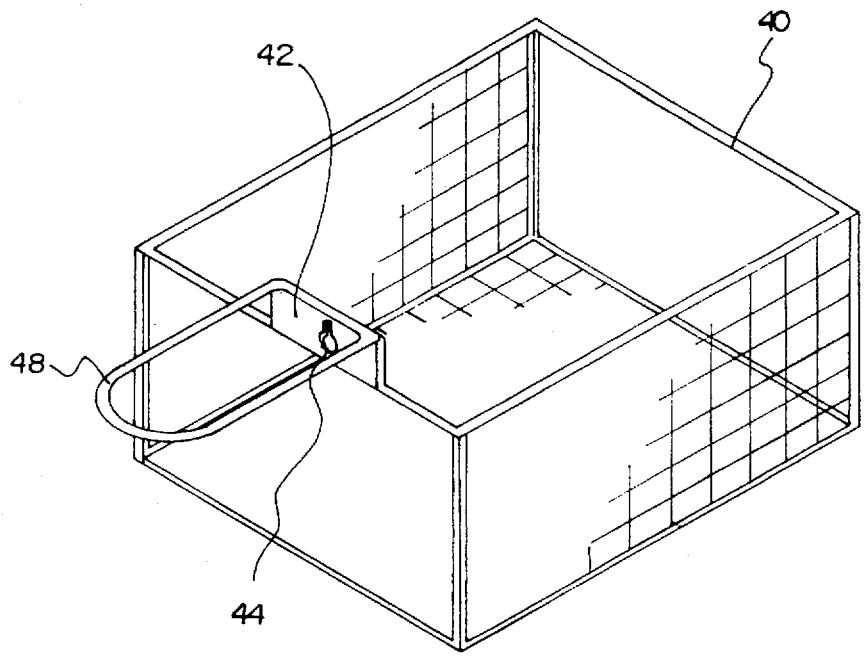
FIG. 3 is an upper perspective view of the wire mesh basket.
Figure 4:
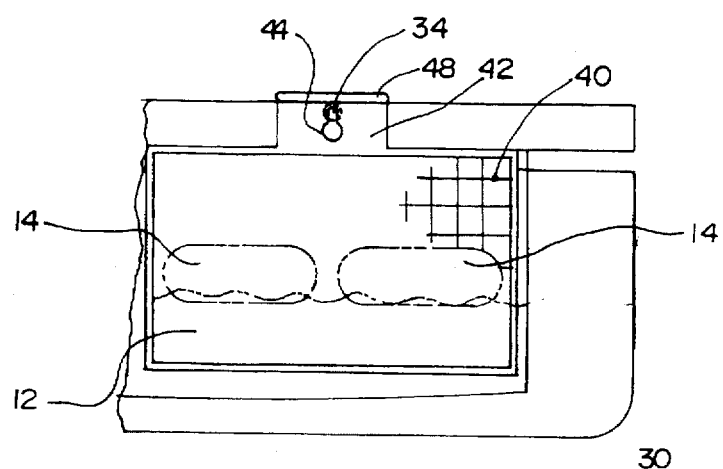
FIG. 4 is a cross sectional view taken along line 4—4 of FIG. 2.

As shown in FIGS. 1 through 4 of the drawings, each of the wire mesh baskets 40 includes a vertical member 42 secured to an upper portion of the wire mesh basket 40. The vertical member 42 includes an aperture 44 for removably receiving a support pin 34 having a flanged end as best shown in FIG. 4 of the drawings. The support pin 34 is secured to an upper interior surface of the fry tank 30 opposite of the flanged end as best shown in FIGS. 2 and 5 of the drawings. The vertical member 42 includes a slot 46 connected to the aperture 44 extending upwardly a finite distance for receiving the support pin 34 as shown in FIG. 3 of the drawings. The width of the slot 46 is narrower than the flanged end for preventing removal of the flanged end portion of the support pin 34 as shown in FIG. 4 of the drawings. The usage of the support pin 34 supporting the wire mesh baskets 40 provides a method of allowing only a portion of the doughnut 14 to be cooked within the cooking oil 12 at one time, thereby requiring flipping of the doughnut 14 over to receive a completely cooked doughnut 14. A looped handle 48 is secured orthogonally to the vertical member 42 opposite of the wire mesh basket 40 and projects away from the wire mesh basket 40 for providing a temperature resistant handle for manually manipulating the wire mesh basket 40.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A Multiple-Doughnut Fryer System comprising:

a housing having a top opening;

a fry tank having an upper flange secured within said housing for containing cooking oil for frying a plurality of doughnuts;

three wire mesh baskets formed for removably projecting within said fry tank adjacent to one another, wherein each said wire mesh basket is formed for removably receiving at least two of said doughnuts;

an elongated heating element having a U-shaped cross-sectional area, wherein said elongated heating element is adjacent said fry tank for heating said cooking oil for frying said plurality of doughnuts; and a pair of elongated insulated support members each having a bottom edge and a top edge, wherein said bottom edge is secured to a floor of said housing and wherein said top edge engages a bottom surface of said fry tank and an upper portion of said insulated support members engages said elongated heating element thereby supporting said elongated heating element and said fry tank.

2. The Multiple-Doughnut Fryer System of claim 1, wherein each of said wire mesh baskets include:

a vertical member secured to an upper portion of said wire mesh basket;

said vertical member includes an aperture for removably receiving a support pin having a flanged end, wherein said support pin is secured to an upper interior surface of said fry tank opposite of said flanged end;

said vertical member includes a slot connected to said aperture extending upwardly a finite distance for receiving said support pin, wherein a width of said slot is narrower than said flanged end; and a looped handle secured orthogonally to said vertical member opposite of said wire mesh basket and projecting away from said wire mesh basket for providing a temperature resistant handle for manually manipulating said wire mesh basket.

3. The Multiple-Doughnut Fryer System of claim 2, including:

an indicator light secured within said housing and electrically connected to said elongated heating element;

a switch secured within said housing and electrically connected to said indicator light opposite of said elongated heating element for controlling said elongated heating element; and a power cord electrically connected to said switch opposite of said indicator light for providing power to said elongated heating element.

4. The Multiple-Doughnut Fryer System of claim 3, including a lid formed to snugly enclose said top opening of said housing thereby preventing the accumulation of debris within said cooking oil.

5. The Multiple-Doughnut Fryer System of claim 4, wherein said housing and said fry tank are formed into an elongated rectangular shape.

6. The Multiple-Doughnut Fryer System of claim 5, including a plurality of gripping pads secured to a bottom surface of said floor of said housing for gripping a support surface during utilization.

* * * * *